US006548580B1

(12) United States Patent
Rohde et al.

(10) Patent No.: US 6,548,580 B1
(45) Date of Patent: Apr. 15, 2003

(54) USE OF STERICALLY HINDERED AMINES OR STABILISED ETHYLENE POLYMERS IN THE PRODUCTION OF PLASTIC BODIES FOR STORAGE AND TRANSPORT OF VEGETABLE OIL ESTERS

(75) Inventors: Wolfgang Rohde, Speyer (DE); Laurent Deloux, Heidelberg (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/555,873
(22) PCT Filed: Dec. 9, 1998
(86) PCT No.: PCT/EP98/08011
§ 371 (c)(1), (2), (4) Date: Jun. 8, 2000
(87) PCT Pub. No.: WO99/32549
PCT Pub. Date: Jul. 1, 1999

(30) Foreign Application Priority Data

Dec. 18, 1997 (DE) .......................................... 197 56 276

(51) Int. Cl.$^7$ ................................................. C08K 5/34
(52) U.S. Cl. .......................... 524/100; 524/99; 523/100
(58) Field of Search ............................ 523/100; 524/99, 524/102

(56) References Cited

U.S. PATENT DOCUMENTS 5,421,381 A * 6/1995 Ewald .......................... 141/98

FOREIGN PATENT DOCUMENTS

| DE | 196 37181 | 3/1997 |
|----|-----------|--------|
| EP | 290 388 | 11/1988 |
| WO | 309 283 | 3/1988 |
| WO | 96/08532 | 3/1996 |
| WO | 98/20065 | 5/1998 |
| WO | 98/27149 | 6/1998 |

OTHER PUBLICATIONS

Ullmann'sEnc.Ind.Chem, 5$^{th}$ Ed.vol. A1, p. 290–293.
Ullmann'sEnc.Ind.Chem, 5$^{th}$ Ed.vol. A1, p. 284–285.
Patent Abs.JP.vol. 018,No. 591(11/94)JP06220263A.
Patent Abs.JP.vol. 015,No. 425(10/91)JP03174459A.

* cited by examiner

*Primary Examiner*—Kriellion A. Sanders
(74) *Attorney, Agent, or Firm*—Keil & Weinkauf

(57) ABSTRACT

Ethylene homo- and copolymers stabilized by sterically hindered amines or by N-hydroxy or N-oxyl derivatives are used to produce articles of plastic and components for the storage and transport of vegetable oil esters.

7 Claims, No Drawings

USE OF STERICALLY HINDERED AMINES OR STABILISED ETHYLENE POLYMERS IN THE PRODUCTION OF PLASTIC BODIES FOR STORAGE AND TRANSPORT OF VEGETABLE OIL ESTERS

The present invention relates to the use of ethylene homo- and copolymers stabilized by sterically hindered amines or their N-hydroxy or N-oxyl derivatives to produce articles of plastic and components for the storage and transport of vegetable oil esters.

The invention also relates to articles of plastic and components for the transport and storage of vegetable oil esters, which are produced using such stabilized polymers, and to ethylene homo- and copolymers stabilized by adding derivatives of quinoline or of diphenylamine.

In automotive fuel systems there is increasing use of plastic fuel tanks (PFTs) of polyethylene for spark-ignition and diesel-engined vehicles. For diesel-operated vehicles in particular the biodiesel fuels based on renewable raw materials are increasing in importance. The principal biodiesel fuels are based on vegetable oil methyl esters (VMEs), of which rapeseed oil methyl ester (RME) is the major representative. As the biodiesel fuels become more important, so will their storage and transport in containers or pipes made of polyethylene.

RME proves to be aggressive to many of the plastics used in the fuel system of a motor vehicle. Even high molecular mass polyethylene, as is used to produce PFTs and other hollow articles, may be attacked by RME, especially at elevated temperature. Its effect is to accelerate the embrittlement of the material, thereby impairing its long-term service properties.

Coating the interior of the hollow articles has been proposed for overcoming this problem. One disadvantage of an interior coating, however, is that it is highly complex to implement industrially and so always gives rise to considerable additional manufacturing costs. Moreover, in the PFT sector there is increasing use of co-extruded 6-layer tanks with a central barrier layer, whose additional internal fluorination would weigh heavily on the manufacturing costs of such PFTs.

It is an object of the present invention to provide ethylene homo- and copolymers, for producing articles of plastic and components for the storage and transport of vegetable oil esters, which are stabilized against the effect of vegetable oil esters.

We have found that this object is achieved by the use of ethylene homo- and copolymers stabilized by sterically hindered amines or by N-hydroxy or N-oxyl derivatives for producing articles of plastic and components for the storage and transport of vegetable oil esters.

We have also found articles of plastic and components for the transport and storage of vegetable oil esters, produced using such stabilized polymers, and ethylene homo- and copolymers stabilized by adding derivatives of quinoline or of diphenylamine.

Suitable stabilizers for the ethylene homo- and copolymers are N-hydroxy and N-oxyl derivatives of sterically hindered amines, but preferably the sterically hindered amines themselves.

By sterically hindered amines are meant all secondary amines whose substitution on the carbons adjacent to the amine nitrogen is such that no single hydrogen remains at these positions. Preference is given to derivatives of 2,2,6,6-tetramethylpiperidine, substituted either at the 4-position or on the amine nitrogen, and to derivatives of quinoline and of diphenylamine.

Examples of suitable amines are the following structures

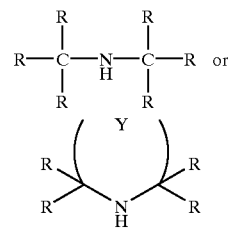

where the Rs are identical or different alkyls, cycloalkyls, aralkyls or aryls, alone or joined in pairs to form a ring system, and Y is a group required to complete a 5- or 6-membered ring. Examples of R are $C_1$–$C_{20}$-alkyl, especially $C_1$–$C_8$-alkyl, $C_5$- or $C_6$-cycloalkyl, benzyl or phenyl. Examples of Y are the alkylene groups —$(CH_2)_2$— and —$(CH_2)_3$—.

Also suitable are the following structures

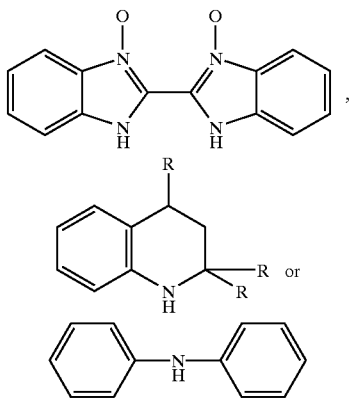

where the aromatic rings may each carry 1 to 3 inert substituents such as $C_1$–$C_4$-alkyl, $C_1$–$C_4$-alkoxy or cyano, for example.

It is preferred to employ sterically hindered amine derivatives of cyclic amines, such as of piperidine or pyrrolidine compounds, whose ring may contain a further heteroatom such as nitrogen, oxygen or sulfur which is not adjacent to the hindered amine nitrogen. The steric hindrance is provided by substituents in both positions adjacent to the amine nitrogen, suitable substituents being hydrocarbon radicals which replace all 4 hydrogens of the α-$CH_2$-groups. Examples of substituents are phenyl, $C_3$–$C_6$-cycloalkyl, benzyl and especially $C_1$–$C_6$-alkyls, it being possible for alkyls attached to the same α carbon to be linked with one another in a 5- or 6-membered ring. The radicals set out individually under $R^1$ and $R^2$ are particularly preferred. Preference is given to using 2,2,6,6-tetraalkylpiperidine derivatives.

Preferred sterically hindered amines or their N-hydroxy or N-oxyl derivatives for use in accordance with the invention are those of the formula I

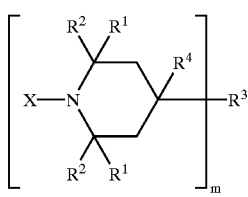

where
- $R^1$ and $R^2$ are $C_1$–$C_4$-alkyl or phenyl or together with the carbon to which they are attached are a 5- or 6-membered saturated hydrocarbon ring,
- $R^3$ is hydrogen, hydroxyl, amino or an m-valent, oxygen- or nitrogen-bonded organic radical or together with $R^4$ is oxygen or a ring structure defined under $R^4$,
- $R^4$ is hydrogen or $C_1$–$C_{12}$-alkyl or together with $R^3$ is oxygen or together with $R^3$ and the carbon to which they are attached is a ring structure

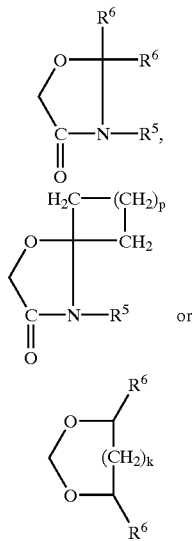

where m is 1 when $R^3$ and $R^4$ unite to form a radical,
- $R^5$ is hydrogen, $C_1$–$C_{12}$-alkyl or —$(CH_2)_z$—$COOR^6$,
- $R^6$ is identical or different $C_1$–$C_{18}$-alkyl,
- X is hydrogen, hydroxyl or oxygen,
- k is 0 or 1,
- z and p are from 1 to 12 and
- m is from 1 to 100.

$R^1$ and $R^2$ may, for example, be the $C_1$–$C_4$-alkyls methyl, ethyl, n-propyl, isopropyl, n-butyl, isobutyl, sec-butyl or tert-butyl or together may form tetra- or pentamethylene. $R^1$ and $R^2$ are preferably methyl.

Examples of $R^4$ are hydrogen, the abovementioned $C_1$–$C_4$-alkyls and also pentyl, sec-pentyl, tert-pentyl, neopentyl, hexyl, 2-methylpentyl, heptyl, 2-methylhexyl, octyl, isooctyl, 2-ethylhexyl, nonyl, 2-methylnonyl, isononyl, 2-methyloctyl, decyl, isodecyl, 2-methylnonyl, undecyl, isoundecyl, dodecyl and isododecyl (isooctyl, isononyl and isodecyl are trivial names deriving from the carbonyl compounds obtained by oxo synthesis; cf. in this respect Ullmann's Encyclopedia of Industrial Chemistry, 5th Edition, Vol. A1, pages 290–293, and Vol. A10, pages 284 and 285).

p is preferably 6–12, especially 9.

z is preferably 1–4, especially 2.

Examples of $R^5$ in addition to hydrogen are the abovementioned $C_1$–$C_{12}$-alkyls. $R^5$ is preferably hydrogen, $C_1$–$C_4$-alkyl or $(CH_2)_z$—$COO(C_1$–$C_6$-alkyl), and with particular preference is —$CH_2$—$CH_2$—$COO(CH_2)_{11}$—$CH_3$ and —$CH_2$—$CH_2$—$COO(CH_2)_{13}$—$CH_3$.

Possible examples of $R^6$ are one of the abovementioned $C_1$–$C_{12}$-alkyls or tridecyl, isotridecyl, tetradecyl, pentadecyl, hexadecyl, heptadecyl or octadecyl. Dodecyl and hexadecyl are preferred.

Examples of preferred radicals $R^3$ are the following m-valent radicals

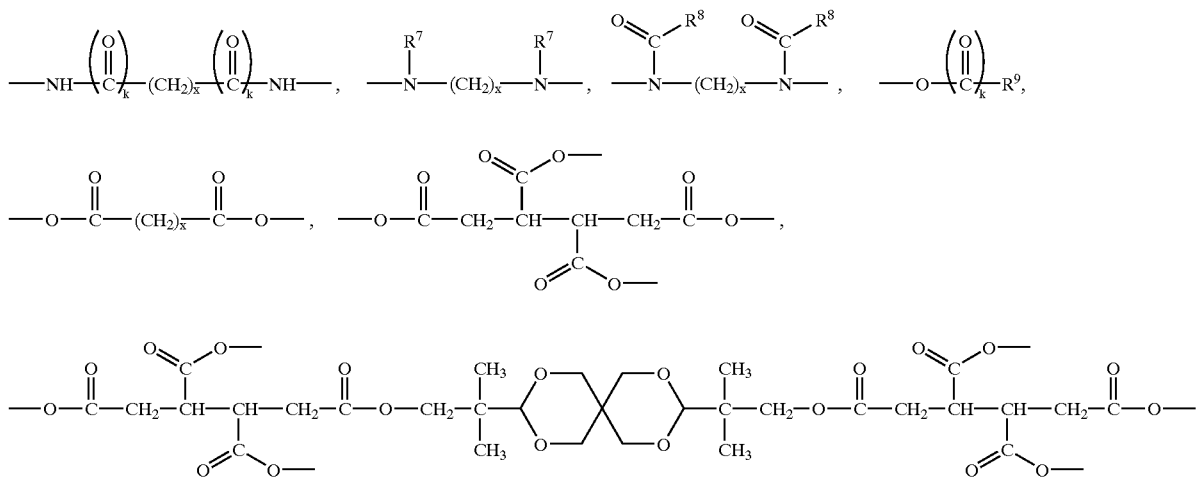

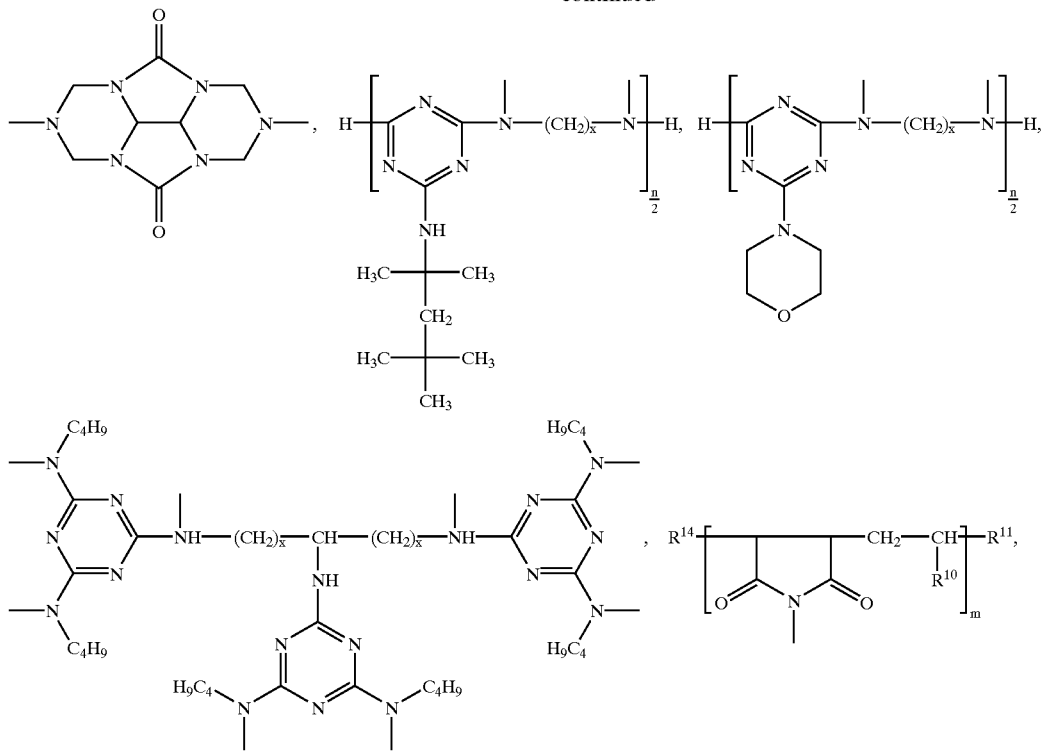

where
- $R^7$ is $C_1$–$C_{12}$-alkyl or —$(CH_2)_z$—$COOR^6$
- $R^8$ is hydrogen or $C_1$–$C_{18}$-alkyl,
- $R^9$ is $C_1$–$C_{18}$-alkyl, vinyl or isopropenyl,
- $R^{10}$ is $C_8$–$C_{22}$-alkyl,
- $R^{11}$ is hydrogen or an organic radical as is normally formed in the free-radical polymerization of the initial monomers,
- k is 0 or 1,
- x is from 1 to 12 and
- n is an even number m.

If $R^3$ is one of these radicals, then $R^4$ is preferably hydrogen. The variable m can be from 1 to 100, and is preferably 1,2,3,4 or a number from 10 to 50, with mixtures generally being employed especially in the case of the oligomeric or polymeric radicals $R^3$.

It has been found that oligomeric and polymeric amine derivatives where m≧2 have a particularly good stabilizing action. Preference is also given to those amine derivatives comprising no hydrolyzable groups, such as ester groups.

Suitable radicals $R^7$ are the same as for $R^5$. $R^7$ is preferably $C_1$–$C_4$-alkyl.

In addition to hydrogen, suitable radicals $R^8$ are the same as for $R^6$. $R^8$ is preferably hydrogen.

Particularly suitable radicals $R^9$ are vinyl, isopropenyl or $C_{15}$–$C_{17}$-alkyls.

Examples of suitable radicals $R^{10}$ are the above-mentioned $C_8$–$C_{18}$-alkyls and also nonadecyl, icosyl, unicosyl and doicosyl. Preference is given here to mixtures of radicals $R^{10}$ which differ in the length of their carbon chain.

The radicals $R^{11}$ are hydrogen or organic radicals as formed in the free-radical polymerization of the initial monomers, in this case from an ethylene derivative and a maleimide derivative; in other words, for example, a radical formed from the polymerization initiator or from a free-radical intermediate, or another such radical, as the skilled worker is aware.

Other preferred amine compounds are:
2,2,6,6-tetramethylpiperidine,
2,2,6,6-tetramethylpiperidin-4-ol,
2,2,6,6-tetramethylpiperidin-4-one,
2,2,6,6-tetramethylpiperidin-4-yl acetate,
2,2,6,6-tetramethylpiperidin-4-yl 2-ethylhexanoate,
2,2,6,6-tetramethylpiperidin-4-yl stearate,
2,2,6,6-tetramethylpiperidin-4-yl benzoate,
2,2,6,6-tetramethylpiperidin-4-yl 4-tert-butylbenzoate,
Bis(2,2,6,6-tetramethylpiperidin-4-yl)succinate,
Bis(2,2,6,6-tetramethylpiperidin-4-yl)adipate,
Bis(2,2,6,6-tetramethylpiperidin-4-yl)sebacate,
Bis(2,2,6,6-tetramethylpiperidin-4-yl)n-butylmalonate,
Bis(2,2,6,6-tetramethylpiperidin-4-yl)phthalate,
Bis(2,2,6,6-tetramethylpiperidin-4-yl)isophthalate,
Bis(2,2,6,6-tetramethylpiperidin-4-yl)terephthalate,
Bis(2,2,6,6-tetramethylpiperidin-4-yl) hexahydroterephthalate,
N,N'-bis(2,2,6,6-tetramethylpiperidin-4-yl)adipinamide,
N-(2,2,6,6-tetramethylpiperidin-4-yl)caprolactam,
N-(2,2,6,6-tetramethylpiperidin-4-yl)dodecylsuccinimide,
2,4,6-tris-[N-butyl-N-(2,2,6,6-tetramethylpiperidin-4-yl)]-s-triazine,
4,4'-ethylenebis(2,2,6,6-tetramethylpiperazin-3-one) and
tris(2,2,6,6-tetramethyl-1-oxylpiperidin-4-yl)phosphite
and the N-hydroxy and N-oxyl derivatives thereof.

Particularly preferred amine compounds are poly[3-icosyl (tetra-cosyl)-1-[2,2,6,6-tetramethylpiperidin-4-yl] pyrrolidine-2,5-dione] (Uvinul® 5050 H, from BASF AG, and especially poly[[6-(1,1,3,3-tetramethylbutyl)amino]-1, 3,5-triazine-2,4-diyl][2,2,6,6-tetramethyl-4-piperidinyl) imino]-1,6-hexanediyl[(2,2,6,6-tetramethyl-4-piperidinyl) imino]] (Chimassorb®944, from Ciba Additives GmbH).

As with those of piperidine, preferred derivatives among those of quinoline and of diphenylamine are those oligomerized or polymerized through appropriate organic radicals. Examples which have proven suitable are polymerized 2,2,4-trimethyl-1,2-dihydroquinoline (TMQ), 6-ethoxy-2,2,4-trimethyl-1,2-dihydroquinoline (ETMQ), styrenized diphenylamine (SDPA) and octylated diphenylamine (ODPA). Such sterically hindered amines or their N-hydroxy or N-oxyl derivatives have to date been used principally for stabilizing rubber; ethylene homo- and copolymers stabilized by adding derivatives of quinoline or of diphenylamine were unknown prior to our invention.

The ethylene homo- and copolymers used in accordance with the invention comprise the sterically hindered amines or their N-hydroxy or N-oxyl derivatives preferably in an amount of from 100 to 5000 ppm, with particular preference in an amount of from 300 to 2000 ppm, based on the total mass of the polymers.

The polyethylene normally includes additional substances for thermal and in-process stabilization. These substances, which may also be used in combination with the RME resistance stabilizers used in accordance with the invention, include sterically hindered phenols, which may also contain nitrogen and/or sulfur as heteroelements, lactones, which may also contain nitrogen and/or sulfur as heteroelements, organic esters of phosphorous acid (e.g. trialkyl phosphites), which may also contain nitrogen and/or sulfur as heteroelements, and alkali metal and alkaline earth metal stearates. Examples of stabilizers from the class of sterically hindered phenols are benzenepropanoic acid 3,5-bis(1,1-dimethylethyl)-4-hydroxy-2,2-bis[[3-[3,5-bis(1,1-dimethylethyl)-4-hydroxyphenyl]-1-oxopropoxy]methyl]-1,3-propanediyl ester (Irganox®1010 from Ciba Additives GmbH), benzenepropanoic acid 3,5-bis(1,1-dimethylethyl)-4-hydroxyoctadecyl ester (Irganox®1076 from Ciba Additives GmbH), 4-[[4,6-bis(octylthio)-1,3,5-triazin-2-yl]amino]-2,6-bis(1,1-dimethylethyl)phenol (Irganox®565 from Ciba Additives GmbH), and N,N'-hexamethylenebis(3,5-di-tert.butyl-4-hydroxyhydrocinnamamide) (Irganox®1098 from Ciba Additives GmbH). Examples of stabilizers from the class of the lactones are benzofuran-2-ones, such as 5,7-di-t-butyl-3-(3,4-dimethylphenyl)-3H-benzofuran-2-one. Examples of stabilizers from the class of the organic phosphites are 2,4-bis(1,1-dimethylethyl)phenol phosphite (Irganox®168 from Ciba Additives GmbH) and phosphorous acid {1,1'-biphenyl}-4,4'-diylbis-, -tetrakis[2,4-bis(1,1-dimethylethyl)phenyl] ester.

The incorporation of the stabilizers into the polymers can take place, for example, during the production of a granular base material or not until during the melting operation in preparation for shaping, which can take place, for example, by extrusion, injection molding or blow molding.

For use in the field of extrusion and blow molding the polyethylene preferably has a melt flow rate MFR (190/21.6) of from 1 to 25 g/10 min, in particular from 2 to 20 g/10 min, and for use in the field of injection molding an MFR (190/2.16) of preferably from 0.1 to 100 g/10 min, in particular from 0.2 to 10 g/10 min.

Particularly suitable for use in accordance with the invention are ethylene homo- and copolymers having a density of from 0.930 to 0.970, in particular from 0.940 to 0.960 g/cm$^3$, and, with particular advantage, the polymer employed is HDPE as normally used, for example, to produce PFTs.

The ethylene homo- and copolymers used in accordance with the invention are outstandingly suited to the production of articles of plastic and components for the transport and storage of vegetable oil esters, especially vegetable oil methyl esters.

By articles of plastic and components in this context are meant all the plastics parts which are exposed to the vegetable oil esters for a prolonged period, especially plastic fuel tanks, but also parts such as pipes and feedlines, bottles, canisters, drums, etc.

EXAMPLES

Examples 1 to 8

High molecular mass polyethylene (Lupolen® 4261 A from BASF AG) was treated with the stabilizers referred to in Table 1. This was done by forming a dry mix from about 150 g of the polyethylene with each of the stabilizers in the concentrations set out in Tab. 1 and subjecting this mix to melting and intensive mixing for 5 minutes on a roll mill at 180° C. The resulting milled sheets were used to produce 4 mm thick compression-molded sheets in accordance with ISO 1872-2. Tensile bars to ISO 527-2 type 1B were punched from these sheets. For each sample, 4 tensile bars were stored at 90° C. for more than 1000 h in RME to which 0.3 ml/l glycerol, 5 ml/l oleic acid and 2.7 ml/l water had been added. Subsequently, these tensile bars were removed from the RME, dried to remove adhering liquid and stored in air at 100°C. for more than 72 h. Following this treatment, the elongation at break was determined as the mean of 4 individual measurements in the tensile test to ISO 527 (Tab. 1). The results of Table 1 show that the samples treated with stabilizers of the sterically hindered amine type (HALS) have the highest values for elongation at break, whereas phenolic and phosphite stabilizers show no effect.

Examples 9 to 11

Lupolen® 4261 A treated in accordance with Tab. 2 with different amounts of the HALS stabilizer Chimassorb® 944 (from Ciba Additives GmbH) was used to produce test bottles (nominal capacity 300 ml) having an average wall thickness of 0.8 mm by blow molding. These test bottles were filled with RME to which 0.3 ml/l glycerol, 5 ml/l oleic acid and 2.7 ml/l water had been added. The bottles, which were not sealed tight in order to avoid internal pressure, were stored in air in a drying cabinet at 80° C. At fixed points in time, bottles were removed. Samples of the exterior wall surface of these bottles were subjected to a determination of the intrinsic viscosity of the polyethylene, as the Staudinger Index in accordance with ISO 1628. The results are shown in Tab. 2.

TABLE 1

Effect of different stabilizers on the elongation at break of polyethylene

| Example No. | Stabilizer | Stabilizer type | Amount [ppm] | Elongation at break ISO 527 [%] |
|---|---|---|---|---|
| 1 | none | | | 47 |
| 2 | IRGANOX 565 | phenol | 300 | 39 |
| 3 | IRGANOX 1098 | phenol | 300 | 44 |
| 4 | IRGANOX 1010 | phosphite | 1000 | 49 |
| 5 | IRGAFOS 168 | phenol | 1000 | 40 |
| 6 | UVINUL 5050H | HALS | 300 | 58 |
| 7 | CHIMASSORB 944 | HALS | 300 | 125 |
| 8 | TINUVIN 783 | HALS | 300 | 71 |

TABLE 2

Degradation of polyethylene at the external surface of bottles filled with RME, following storage in air at 80° C.

| Example No. | Addition of CHIMASSORB 944 [ppm] | Staudinger Index [ccm/g] after storage period | | | |
|---|---|---|---|---|---|
| | | start | 8 d | 15 d | 22 d |
| 9 | none | 370 | 92 | 45 | 36 |
| 10 | 300 | 370 | 358 | 55 | 61 |
| 11 | 1100 | 370 | 330 | 318 | 260 |

Examples 12 and 13

High molecular mass polyethylene (Lupolen® 4261 A (from BASF AG) was treated with the stabilizer referred to in Table 3 (Flectol® TMQ, from Flexsys GmbH). This was done by dissolving the stabilizer in chloroform, in the concentration set out in Tab. 3, and mixing this solution with Lupolen®. The chloroform was evaporated and the dried mixture was subjected to melting and intensive mixing for 5 minutes on a roll mill at 180° C. The resulting milled sheets were used to produce 1 mm thick compression-molded sheets to ISO 1872-2. These sheets were cut into strips about 15 mm wide. For each sample, one strip was stored at 90° C. for more than 72 h in RME (Connester ME 6020) to which 0.3 ml/l glycerol, 5 ml/l oleic acid and 2.7 ml/l water had been added. Subsequently, these strips were removed from the RME, dried to remove adhering liquid and stored in air at 120° C. Following this treatment the intrinsic viscosity of the polyethylene was measured, as the Staudinger Index in accordance with ISO 1628. The results are shown in Tab. 3.

TABLE 3

Effect of stabilizers on the degradation of polyethylene on storage in RME

| Example No. | Stabilizer | Addition of stabilizer [ppm] | Staudinger Index [ccm/g] after storage period | | | | |
|---|---|---|---|---|---|---|---|
| | | | start | 50 h | 239 h | 500 h | 1004 h |
| 12 | none | | 370 | 119 | 98 | a) | a) |
| 13 | 2,2,4-tri-methyl-1,2-dihydro-quinoline polymerized (Flectol ® TMQ) | 1000 | 335 | 323 | 334 | 323 | 332 | a)Sample embrittled

We claim:

1. A method for storing and transporting vegetable oil esters comprising partially or completely filling a plastic article and/or component comprising ethylene homo- and copolymers stabilized by sterically hindered amines or their N-hydroxy or N-oxyl derivatives with vegetable oil esters.

2. The method as claimed in claim 1, wherein the ethylene homo- and copolymers are stabilized by sterically hindered amines or their N-hydroxy or N-oxyl derivatives, of the formula I

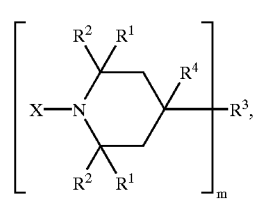

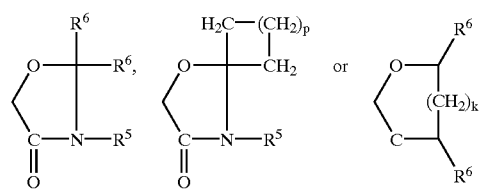

where $R^1$ and $R^2$ are $C_1$–$C_4$-alkyl or phenyl or together with the carbon to which they are attached are a 5- or 6-membered saturated hydrocarbon ring, $R^3$ is hydrogen, hydroxyl, amino or an m-valent, oxygen- or nitrogen-bonded organic radical or together with $R^4$ is oxygen or a ring structure defined under $R^4$, $R^4$ is hydrogen or $C_1$–$C_{12}$-alkyl or together with $R^3$ is oxygen or together with $R^3$ and the carbon to which they are attached is a ring structure where m is 1 when $R^3$ and $R^4$ unite to form a ring structure, $R^5$ is hydrogen, $C_1$–$C_{12}$-alkyl or —$(CH_2)_z$—$COOR^6$, $R^6$ is identical or different $C_1$–$C_{18}$-alkyl, X is hydrogen, hydroxyl or oxygen, k is 0 or 1, z and p are from 1 to 12 and m is from 1 to 100.

3. The method as claimed in claim 1, wherein the ethylene homo- and copolymers comprise sterically hindered amines or their N-hydroxy or N-oxyl derivatives in an amount of from 100 to 5000 ppm, based on the total mass of the polymers.

4. The method as claimed in claim 1, wherein the ethylene homo- and copolymers have a density of from 0.930 to 0.970 g/cm³.

5. The method as claimed in claim 1, wherein the ethylene polymer is HDPE.

6. The method as claimed in claim 1, wherein the vegetable oil ester is rapeseed oil methyl ester.

7. The method as claimed in claim 2, wherein the ethylene homo- and copolymers comprise sterically hindered amines or their N-hydroxy or N-oxyl derivatives in an amount of from 100 to 5000 ppm, based on the total mass of the polymers.

* * * * *